United States Patent
Chang et al.

(10) Patent No.: US 8,707,777 B2
(45) Date of Patent: Apr. 29, 2014

(54) POSITION DETECTION APPARATUS FOR TIRE PRESSURE MONITORING SYSTEM (TPMS) SENSORS AND METHOD THEREOF

(75) Inventors: Yul Ji Chang, Gyeonggi-do (KR); Ki Won Lee, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 105 days.

(21) Appl. No.: 13/534,702

(22) Filed: Jun. 27, 2012

(65) Prior Publication Data

US 2013/0145835 A1  Jun. 13, 2013

(30) Foreign Application Priority Data

Dec. 12, 2011 (KR) .................. 10-2011-0133156

(51) Int. Cl.
  *B60C 23/02* (2006.01)
  *G06F 7/00* (2006.01)
(52) U.S. Cl.
  USPC ................... 73/146.5; 701/1; 701/36
(58) Field of Classification Search
  USPC ................... 73/146–146.8
  See application file for complete search history.

(56) References Cited

U.S. PATENT DOCUMENTS

| | | | |
|---|---|---|---|
| 6,998,974 B2 | 2/2006 | Bergerhoff et al. | |
| 2003/0076222 A1 | 4/2003 | Fischer et al. | |
| 2005/0044946 A1* | 3/2005 | Agrotis | 73/146.5 |
| 2006/0156802 A1* | 7/2006 | Cohen | 73/146 |
| 2008/0051963 A1 | 2/2008 | Kagawa | |
| 2011/0209536 A1* | 9/2011 | Craig et al. | 73/146 |
| 2011/0219864 A1* | 9/2011 | Yukawa et al. | 73/146.3 |
| 2011/0282546 A1* | 11/2011 | Heo et al. | 701/36 |
| 2013/0218364 A1* | 8/2013 | Juzswik | 701/1 |

FOREIGN PATENT DOCUMENTS

| | | |
|---|---|---|
| JP | 2007-320423 A | 12/2007 |
| JP | 2010122023 A | 6/2010 |
| KR | 2009-0058617 A | 6/2009 |
| KR | 2009-0079305 A | 7/2009 |
| KR | 10-2011-0060246 | 6/2011 |
| KR | 2011-0061184 A | 6/2011 |

\* cited by examiner

*Primary Examiner* — Andre Allen
(74) *Attorney, Agent, or Firm* — Edwards Wildman Palmer LLP; Peter F. Corless

(57) ABSTRACT

Position detection apparatuses of TPMS sensors and a method thereof are provided. One aspect of the invention provides a position detection apparatus for tire pressure monitoring system (TPMS) sensors mounted on each wheel of a vehicle. The apparatus includes: a receiver programmed to receive TPMS signals from each TPMS sensor; and a controller programmed to (i) sequentially arrest rotation of each wheel of the vehicle and (ii) detect a position of each TPMS sensor by associating a TPMS signal that is not received at the time of arresting a specific wheel with a position of the specific wheel that is arrested at that time.

19 Claims, 3 Drawing Sheets

POSITION DETECTION APPARATUS FOR TIRE PRESSURE MONITORING SYSTEM (TPMS) SENSORS AND METHOD THEREOF

CROSS-REFERENCE TO RELATED APPLICATION

This application is based on and claims priority from Korean Patent Application No. 10-2011-0133156, filed on Dec. 12, 2011 in the Korean Intellectual Property Office, the disclosure of which is incorporated herein in its entirety by reference.

FIELD OF THE INVENTION

The present invention relates to a position detection apparatus of TPMS sensors and a method thereof, and more particularly, to a position detection apparatus of TPMS sensors and a method thereof capable of detecting whether TPMS sensors are mounted on any one of the wheels of a vehicle by matching non-received TPMS signals with positions of arrested wheels by sequentially arresting the rotation of each wheel.

BACKGROUND OF THE INVENTION

A system for measuring air pressure of vehicle tires and informing a driver of information regarding the measured air pressure and beforehand preventing the risk of an accident by providing warning signals to a driver when the air pressure of the tires is below specified pressure is referred to as a tire pressure monitoring system (hereinafter, referred to as TPMS).

TPMSes utilize either an indirect scheme and a direct scheme. The indirect scheme senses RPM of each wheel by an anti-lock brake system (ABS) sensor to sense a state of tires and the direct scheme senses the pressure of tires by embedding the air pressure sensors in the tires.

The indirect scheme has degraded reliability. As a result, the TPMS using the direct scheme has been commercialized.

TPMSes using the direct scheme include a "high-line" type and a "low-line" type.

The low-line type can warn only when tires are not within the specified pressure range, while the high-line type can indicate which positions of the tires are not within the specified pressure range by adding four low frequency initiators (LFIs) around each tire.

A high-line TPMS includes four separate LFI—one for each TPMS sensor in the vicinity of each tire so as to detect the positions of the sensors. Therefore, cost and weight of the TPMS are increased and assembly time can be increased.

SUMMARY OF THE INVENTION

Accordingly, the present invention has been made to solve the above-mentioned problems occurring in the prior art while advantages achieved by the prior art are maintained intact.

One aspect of the invention provides a position detection apparatus for tire pressure monitoring system (TPMS) sensors mounted on each wheel of a vehicle. The apparatus includes: a receiver programmed to receive TPMS signals from each TPMS sensor; and a controller programmed to (i) sequentially arrest rotation of each wheel of the vehicle and (ii) detect a position of each TPMS sensor by associating a TPMS signal that is not received at the time of arresting a specific wheel with a position of the specific wheel that is arrested at that time.

This aspect of the invention can have a variety of embodiments. The apparatus can further include a storage unit programmed to store mounting positions of each of a plurality of arresting devices and identifiers of each TPMS sensor. The controller can be programmed to extract the identifiers from the received TPMS signals in a state in which rotation of each wheel of the vehicle is not arrested and store the extracted identifiers in the storage unit. The controller can be programmed to store detected positions of each TPMS sensor in the storage unit.

The controller can be programmed to interact with an anti-lock brake system (ABS) to effect the arresting of a specific wheel.

Another aspect of the invention provides a position detection apparatus for tire pressure monitoring system (TPMS) sensors. The apparatus includes: a storage unit programmed to store mounting positions of each a plurality of arresting device and identifiers of each TPMS sensor; TPMS sensors adapted and configured for mounting on each wheel of a vehicle and transmission of TPMS signals having unique identifiers interposed thereinto when the wheels reach a reference phase; a receiver programmed to receive the TPMS signals from each TPMS sensor; arresting devices adapted and configured for (i) mounting on each wheel of the vehicle and (ii) selective arresting of rotation of the wheels; and a controller programmed to control the arresting devices to (i) sequentially arrest each wheel of the vehicle and (ii) detect a position of each TPMS sensor by associating a TPMS signal that is not received at the time of arresting a specific wheel a position of the specific wheel that is arrested at that time.

This aspect of the invention can have a variety of embodiments. In one embodiment, the controller is programmed to extract the identifiers from the received TPMS signals in a state in which the driving of each wheel of the vehicle is not arrested and store the extracted identifiers in the storage unit. The controller can be programmed to store detected positions of each TPMS sensor in the storage unit. The arresting devices can be brakes and the controller can be programmed to interact with an anti-lock brake system (ABS) to control the arresting devices. The controller can be programmed to perform a position detection operation when the vehicle starts or upon request. The controller can again perform the position detection operation when three TPMS signals having different identifiers are not received when one or more wheels are arrested.

The arresting devices can include an FL arresting device that is mounted on a front left wheel of the vehicle, an FR arresting device that is mounted on a front right wheel of the vehicle, an RL arresting device that is mounted on a rear left wheel of the vehicle, and an RR arresting device that is mounted on a rear right wheel of the vehicle.

The controller can control the arresting of each wheel of the vehicle in a sequence of the FL arresting device, the FR arresting device, the RL arresting device, and the RR arresting device.

Another aspect of the invention provides a position detection method for tire pressure monitoring system (TPMS) sensors mounted on each wheel of a vehicle. The method includes: arresting the rotation of a first wheel; receiving TPMS signals from TPMS sensors mounted on non-arrested wheels; and associating a TPMS signal that is not received at the time of arresting the first wheel with a position of the arrested first wheel.

This aspect of the invention can include a variety of embodiments. The method can include repeating the arresting, receiving, and associating steps for each remaining wheel to detect positions of each remaining sensor. The identifiers of the TPMS sensors can be included in each TPMS signal. The method can include storing a detected position of a TPMS sensor. A case in which three TPMS signals having different identifiers are not received in a state in which the driving of the first wheel is arrested can be returned as an error. Arresting can be performed in a sequence of a front left wheel, a front right wheel, a rear left wheel, and a rear right wheel.

DEFINITIONS

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, exemplary embodiments of the present invention will be described in detail with reference to the accompanying drawings.

Figure 1:
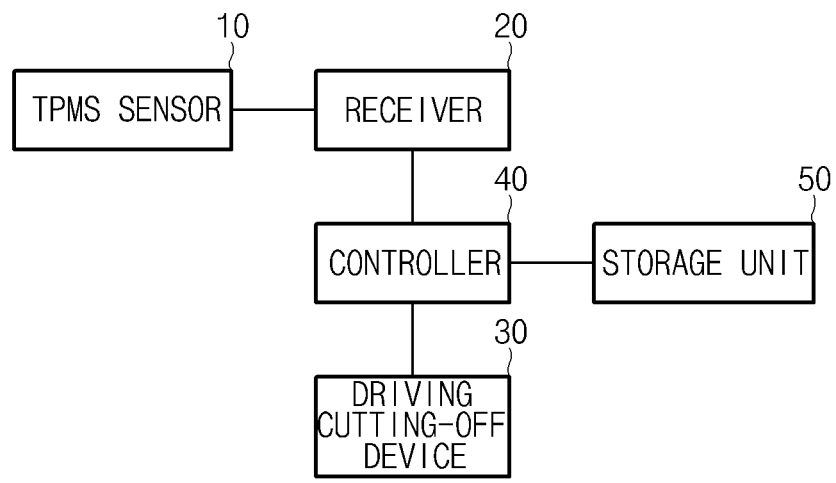
FIG. 1 is a configuration diagram of a position detection apparatus of TPMS sensors according to an exemplary embodiment of the present invention.

FIG. 1 is a configuration diagram of a position detection apparatus of TPMS sensors according to an exemplary embodiment of the present invention.

As shown in FIG. 1, a position detection apparatus of TPMS sensors according to an exemplary embodiment of the present invention is configured to include a TPMS sensor 10, a receiver 20, an arresting device 30, a controller 40, and a storage unit 50.

Figure 2:
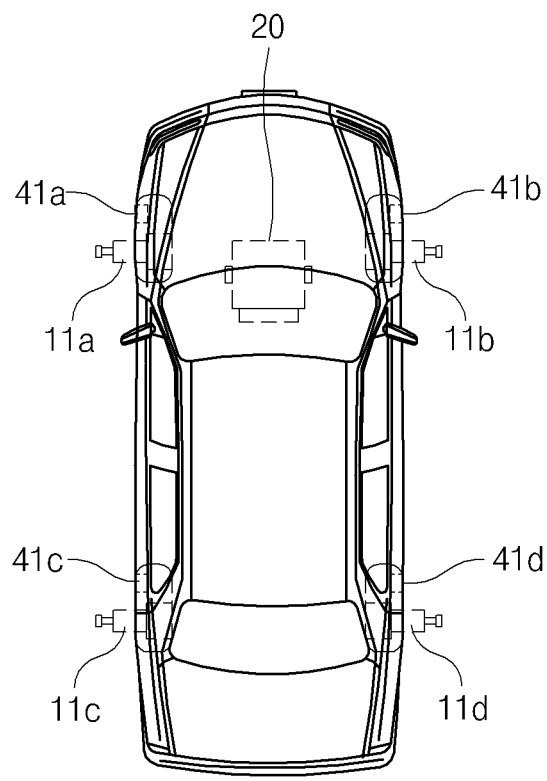
FIG. 2 is an exemplified diagram showing an arresting device and positions of TPMS sensors used in the exemplary embodiment of the present invention.

Describing each component, as shown in FIG. 2, the TPMS sensor 10 includes an FL TPMS sensor 11a that is mounted on a front left (FL) wheel of a vehicle, an FR TPMS sensor 11b that is mounted on a front right (FR) wheel, an RL TPMS sensor 11c that is mounted on a rear left (RL) wheel, and an RR TPMS sensor 11d that is mounted on a rear right (RR) wheel. In this configuration, each TPMS sensor 11a to 11d is embedded in tires of corresponding wheels and therefore, positions of the corresponding TPMS sensors are also changed when the positions of the tires are changed.

Each TPMS sensor 11a to 11d transmits a TPMS signal including their own identifiers when the corresponding wheels reach the reference phase during the rotation. In this case, the TPMS signals are a radio frequency signal that includes a temperature value and a pressure value of tires.

The receiver 20, which is an RF receiver, receives the TPMS signal that is transmitted from each TPMS sensor 11a to 11d.

As shown in FIG. 2, the arresting device 30 includes an arresting device 41a that is mounted on a front left (FL) wheel of a vehicle, an arresting device 41b that is mounted on a front right (FR) wheel, an arresting device 41c that is mounted on a rear left (RL) wheel, and an arresting device 11d that is mounted on a rear right (RR) wheel. In this case, each arresting device 41a to 41d is disposed on a brake disc and therefore, the position of the corresponding arresting device is not changed even when the positions of the tires are changed. That is, the position of the arresting device is fixed and therefore, the controller 40 knows the mounting positions of each arresting device 41a to 41d.

Each arresting device 41a to 41d, which can be a brake module, arrests the rotation of the corresponding wheels according to the control of the controller 40.

The controller 40 operated under the specific conditions controls the arresting device 30 to sequentially arrest the rotation of each wheel at a predetermined time interval.

In this case, the specific conditions can include when a vehicle reaches a predetermined speed range (for example, 20 Kph to 40 Kph) after a vehicle starts, when a vehicle reaches a predetermined speed range (for example, 20 Kph to 40 Kph) after a manual operation of a driver, or the like.

Further, the controller 40 can control the arresting device 30 to arrest the rotation of the wheels within a range in which a vehicle is naturally travelling.

In addition, the controller 40 controls the arresting device 30 so as to arrest the rotation of the wheels in a sequence of FL, FR, RL, and RR when controlling the rotation of each wheel.

Further, the controller 40 matches the non-received signals among the TPMS signals received by the receiver 40 after rotation of the specific wheels is arrested; that is, the non-received TPMS signals after arresting the rotation of the specific wheel among four TPMS signals received when the rotation of the wheels is not arrested with the positions of the arrested wheels to detect the positions of the TPMS sensors.

For example, an identifier of the FL TPMS sensor 11a is referred to as AAA, an identifier of the FR TPMS sensor 11b is referred to as BBB, an identifier of the RL TPMS sensor 11c is referred to as CCC, and an identifier of the RR TPMS sensor 11d is referred to as DDD. In this case, it is not known whether each TPMS sensor 11a to 11d is mounted on any wheel.

When each wheel is normally driven, the receiver 20 receives the TPMS signal having the AAA identifier from the FL TPMS sensor 11a, the TPMS signal having the BBB identifier from the FR TPMS sensor 11b, the TPMS signal having the CCC identifier from the RL TPMS sensor 11c, and the TPMS signal having the DDD identifier from the RR TPMS sensor 11d.

In this case, when the controller 40 controls the arresting device 41a that is mounted on the front left (FL) wheel to arrest the rotation of the front left wheel, the TPMS sensors that are each mounted on the FR wheel, the RL wheel, and the RR wheel transmit the TPMS signals having their own identifiers, while the TPMS sensor that is mounted on the front left wheel does not transmit the TPMS signal since the front left wheel does not reach the reference phase.

That is, the TPMS sensor 11a does not transmit the TPMS signal having the AAA identifier and therefore, the receiver 20 does not receive the TPMS signal having the AAA identifier.

Consequently, when the controller 40 controls the arresting device 41a that is mounted on the front left (FL) wheel, the TPMS sensor that is mounted on the front left (FL) wheel is recognized as a sensor having the AAA identifier since the TPMS sensor does not receive the TPMS signal having the AAA identifier, and the TPMS sensor having the AAA identifier is determined as being mounted on the front left wheel.

The controller 40 repeatedly performs the aforementioned processes on the remaining arresting devices 41b to 41d to detect the positions of the TPMS sensors.

In this case, the controller 40 controls the corresponding arresting device so as to arrest the rotation of any wheel and detects if TPMS signals having different identifiers are received by the receiver 40.

The storage unit 50 stores the identifiers of each TPMS sensor 11a to 11d according to the control of the controller 40.

In addition, the storage unit 50 stores the positions of each TPMS sensor 11a to 11d according to the control of the controller 40.

In an exemplary embodiment of the present invention, the controller 40 does not directly control the arresting device 30, but can interact with the anti-lock brake system (ABS) to indirectly control the arresting device 30.

Figure 3:
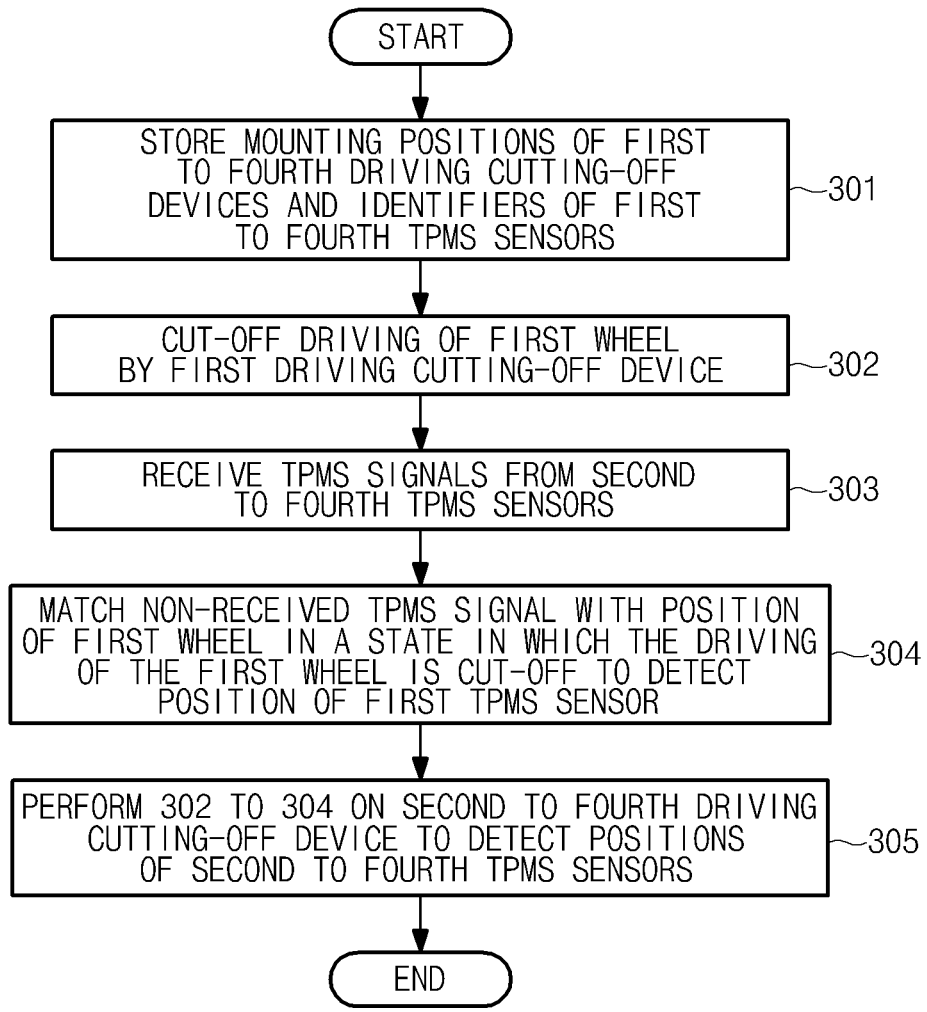
FIG. 3 is a flow chart of a position detection method of TPMS sensors according to an exemplary embodiment of the present invention.

FIG. 3 is a flow chart of a position detection method of TPMS sensors according to an exemplary embodiment of the present invention.

First, the storage unit 50 stores mounting positions of first to fourth arresting devices and identifiers of first to fourth TPMS sensors (301).

Next, the first arresting device arrests the rotation of the first wheel (302).

Next, the receiver 20 receives the TPMS signals from the second to fourth TPMS sensors (303).

Next, the controller 40 matches the TPMS signals that are not received in the receiver 20 with the position of the first wheel in the state in which the rotation of the first wheel is arrested to detect the position of the first TPMS sensor (304).

Next, the controller 40 performs S302 to S304 on the second to fourth arresting devices to detect the positions of the second to fourth TPMS sensors (305). That is, the controller 40 controls the corresponding arresting devices in a sequence of the front left wheel, the front right wheel, the rear left wheel, and the rear right wheel to arrest the rotation of the wheels.

Through the above processes, it can be appreciated that the TPMS sensors can be mounted on any wheel of a vehicle.

The exemplary embodiments of present invention can detect whether the TPMS sensors are mounted on any one of wheels of a vehicle by matching the non-received TPMS signals with the positions of arrested wheels by sequentially arresting the rotation of each wheel in a state in which the identifiers (IDs) of each TPMS signal are stored.

Further, exemplary embodiments of the present invention can detect the positions of the TPMS sensor without mounting the LFIs, thereby minimizing the cost and weight of the TPMS and minimizing assembly time.

Although preferred embodiments of the present invention have been described for illustrative purposes, those skilled in the art will appreciate that various modifications, additions and substitutions are possible, without departing from the scope and spirit of the invention as disclosed in the accompanying claims.

For example, although the invention is described in the context of a four-wheeled automobile, one or ordinary skill in the art will readily appreciate that the invention can applied to vehicles having n wheels (n being a natural number greater than 2) by momentarily arresting the rotation of one wheel while receiving TPMS signals from the remaining n-1 wheels. For example, the invention could be applied to a vehicle having six wheels so long as the rotation of each wheel can be individually arrested.

Additionally, although various aspects of the invention are in the context of a single unit or a plurality of units, it is understood that the invention can also be performed by a plurality of units or a single unit, respectively.

Furthermore, the control logic of the present invention can be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

What is claimed is:

1. A position detection apparatus for tire pressure monitoring system (TPMS) sensors mounted on each wheel of a vehicle, the apparatus comprising:
   a receiver programmed to receive TPMS signals from each TPMS sensor; and
   a controller programmed to (i) sequentially arrest rotation of each wheel of the vehicle and (ii) detect a position of each TPMS sensor by associating a TPMS signal that is not received at the time of arresting a specific wheel with a position of the specific wheel that is arrested at that time.

2. The apparatus of claim 1, further comprising:
   a storage unit programmed to store mounting positions of each of a plurality of arresting devices and identifiers of each TPMS sensor.

3. The apparatus of claim 2, wherein the controller is programmed to extract the identifiers from the received TPMS signals in a state in which rotation of each wheel of the vehicle is not arrested and store the extracted identifiers in the storage unit.

4. The apparatus of claim 2, wherein the controller is programmed to store detected positions of each TPMS sensor in the storage unit.

5. The apparatus of claim 1, the controller is programmed to interact with an anti-lock brake system (ABS) to effect the arresting of a specific wheel.

6. A position detection apparatus for tire pressure monitoring system (TPMS) sensors, the apparatus comprising:

a storage unit programmed to store mounting positions of each a plurality of arresting device and identifiers of each TPMS sensor;

TPMS sensors adapted and configured for mounting on each wheel of a vehicle and transmission of TPMS signals having unique identifiers interposed thereinto when the wheels reach a reference phase;

a receiver programmed to receive the TPMS signals from each TPMS sensor;

arresting devices adapted and configured for (i) mounting on each wheel of the vehicle and (ii) selective arresting of rotation of the wheels; and a controller programmed to control the arresting devices to (i) sequentially arrest each wheel of the vehicle and (ii) detect a position of each TPMS sensor by associating a TPMS signal that is not received at the time of arresting a specific wheel a position of the specific wheel that is arrested at that time.

7. The apparatus of claim 6, wherein the controller is programmed to extract the identifiers from the received TPMS signals in a state in which the driving of each wheel of the vehicle is not arrested and store the extracted identifiers in the storage unit.

8. The apparatus of claim 6, wherein the controller is programmed to store detected positions of each TPMS sensor in the storage unit.

9. The apparatus of claim 6, wherein the arresting devices are brakes and the controller is programmed to interact with an anti-lock brake system (ABS) to control the arresting devices.

10. The apparatus of claim 6, wherein the controller is programmed to perform a position detection operation when the vehicle starts or upon request.

11. The apparatus of claim 10, wherein the controller again performs the position detection operation when three TPMS signals having different identifiers are not received when one or more wheels are arrested.

12. The apparatus of claim 6, wherein the arresting devices include an FL arresting device that is mounted on a front left wheel of the vehicle, an FR arresting device that is mounted on a front right wheel of the vehicle, an RL arresting device that is mounted on a rear left wheel of the vehicle, and an RR arresting device that is mounted on a rear right wheel of the vehicle.

13. The position detection apparatus of TPMS sensors according to claim 12, wherein the controller controls the arresting of each wheel of the vehicle in a sequence of the FL arresting device, the FR arresting device, the RL arresting device, and the RR arresting device.

14. A position detection method for tire pressure monitoring system (TPMS) sensors mounted on each wheel of a vehicle, the method comprising:

arresting the rotation of a first wheel;

receiving TPMS signals from TPMS sensors mounted on non-arrested wheels; and associating a TPMS signal that is not received at the time of arresting the first wheel with a position of the arrested first wheel.

15. The method of claim 14, further comprising:

repeating the arresting, receiving, and associating steps for each remaining wheel to detect positions of each remaining sensor.

16. The method of claim 14, wherein the identifiers of the TPMS sensors are included in each TPMS signal.

17. The method of claim 14, further comprising:

storing a detected position of a TPMS sensor.

18. The method of claim 14, wherein a case in which three TPMS signals having different identifiers are not received in a state in which the driving of the first wheel is arrested is returned as an error.

19. The method of claim 14, wherein arresting is performed in a sequence of a front left wheel, a front right wheel, a rear left wheel, and a rear right wheel.

* * * * *